United States Patent
Karakas

(10) Patent No.: US 6,586,701 B2
(45) Date of Patent: Jul. 1, 2003

(54) RESISTANCE WELDING METHOD AND DEVICE

(76) Inventor: Erdogan Karakas, Kleinburgwedeler Strasse 12, 30938, Burgwedel (DE)

( * ) Notice: Subject to any disclaimer, the term of this patent is extended or adjusted under 35 U.S.C. 154(b) by 0 days.

(21) Appl. No.: 09/963,390

(22) Filed: Sep. 27, 2001

(65) Prior Publication Data

US 2002/0011471 A1 Jan. 31, 2002

Related U.S. Application Data

(63) Continuation of application No. PCT/EP00/02840, filed on Mar. 31, 2000.

(30) Foreign Application Priority Data

Apr. 1, 1999 (DE) .......................................... 199 15 121
May 20, 1999 (DE) .......................................... 199 23 172

(51) Int. Cl.⁷ .............................................. B23K 11/24
(52) U.S. Cl. ..................................................... 219/110
(58) Field of Search ................................ 219/110, 108, 219/109

(56) References Cited

U.S. PATENT DOCUMENTS

| | | | | |
|---|---|---|---|---|
| 3,636,298 A | * | 1/1972 | Risberg et al. | 219/108 |
| 4,214,164 A | * | 7/1980 | Traub et al. | 219/110 |
| 4,409,461 A | | 10/1983 | Mizutani | |
| 4,912,294 A | * | 3/1990 | Tsujii | 219/86.8 |
| 4,973,815 A | | 11/1990 | Ito et al. | |
| 5,237,147 A | | 8/1993 | Pazzaglia | |
| 5,489,757 A | * | 2/1996 | Schuermann et al. | 219/110 |
| 5,558,785 A | * | 9/1996 | Killian et al. | 219/110 |
| 5,965,038 A | * | 10/1999 | Nomura et al. | 219/110 |
| 6,011,235 A | * | 1/2000 | Mukai et al. | 219/110 |
| 6,046,424 A | * | 4/2000 | Jochi | 219/110 |

FOREIGN PATENT DOCUMENTS

| | | |
|---|---|---|
| DE | 30 05 083 | 9/1989 |
| DE | 41 13 117 | 5/1992 |
| DE | 44 40 351 | 12/1995 |
| DE | 295 08 868 | 8/1996 |
| DE | 295 08 869 | 11/1996 |
| EP | 0 261 328 | 3/1988 |
| EP | 0 688 626 | 12/1995 |
| EP | 0 756 915 | 2/1997 |
| EP | 0 835 713 | 4/1998 |
| EP | 199 15 121 | 10/2000 |

OTHER PUBLICATIONS

Internationaler Recherchenbericht (4 pgs.) dated Mar. 31, 2000, PCT/EP00/02841.
Internationaler Vorläufiger Prüfungsbericht (5 pgs.) dated Mar. 31, 2000, PCT/EP00/02841.
Notification of Transmittal of Copies of Translation of the International Preliminary Examination Report dated Oct. 11, 2001 (5 pgs.), PCT/EP00/02841.

* cited by examiner

Primary Examiner—Clifford C. Shaw
(74) Attorney, Agent, or Firm—Shlesinger, Arkwright & Garvey LLP

(57) ABSTRACT

The invention relates to a resistance welding method, especially for the resistance welding of aluminum sheets. According to the inventive method, a direct voltage which is applied to welding electrodes is commutated during the welding process in order to generate a welding alternating current. According to the invention, at least one parameter of the welding process is measured during welding, whereby the commutation of the direct voltage ensues according to the measured parameter or to at least one of the measured parameters. The inventive method reliably eliminates the occurrence of temperature differences between the welding electrodes which cause the welding electrodes to wear unevenly and which lead to a formation of a welding spot that is asymmetrical with regard to the contact plane between the work pieces to be welded.

24 Claims, 2 Drawing Sheets

FIG.1

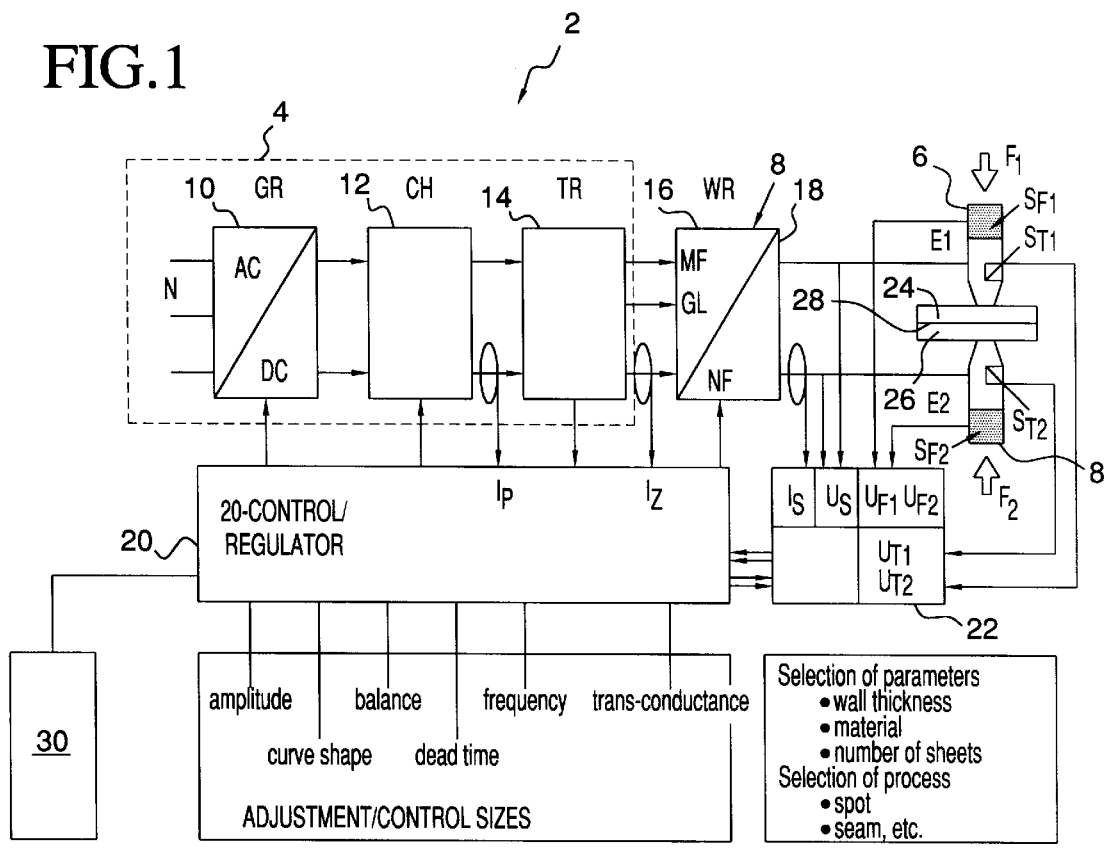

| | |
|---|---|
| N | : net |
| GR | : rectifier |
| AC | : alternating current |
| DC | : direct current |
| CH | : chopper |
| TR | : transformer |
| WR | : inverter |
| MF | : medium frequency |
| GL | : rectification of MF impulses |
| NF | : low frequency |
| E1 | : electrode 1 |
| E2 | : electrode 2 |
| F1 | : force at electrode E1 |
| F2 | : force at electrode E2 |
| $I_p$ | : primary current |
| $I_z$ | : intermediate current |
| $I_s$ | : secondary current |
| $U_s$ | : secondary voltage |
| $U_{T1}$ | : the voltage as a temperature function of electrode E1 |
| $U_{T2}$ | : the voltage as a temperature function of electrode E2 |
| $U_{F1}$ | : the voltage as a pressure function of electrode E1 |
| $U_{F2}$ | : the voltage as a pressure |
| $S_{T1}$ | : temperature sensor at E1 |
| $S_{T2}$ | : temperature sensor at E2 |
| $S_{F1}$ | : force sensor for electrode E1 |
| $S_{F2}$ | : force sensor for electrode E2 |

- E1 : electrode 1
- E2 : electrode 2
- t1 : duration of the positive half wave
- t2 : duration of the negative half wave
- T1 : temperature of electrode 1
- T2 : temperature of electrode 2
- t : time axis
- A : amplitude
- $a_1$ : amplitude of positive half wave
- $a_2$ : amplitude of negative half wave

- TO : dead time
- α : pitch angle

RESISTANCE WELDING METHOD AND DEVICE

CROSS REFERENCE TO RELATED APPLICATIONS

This application is a continuation of International Application No. PCT/EP/00/2840, filed Mar. 31, 2000, which claims the priority of German Application No. 199 23 172.9, filed May 20, 1999 and of German Application No. 199 15 121.0, filed Apr. 1, 1999, and each of which is incorporated herein by reference.

This application relates to concurrently filed application Ser. No. 09/963,658, filed Sep. 27, 2001, which is a continuation of International Application No. PCT/EP00/02841, filed Mar. 31, 2000, which claims the priority of German Application No. 199 15 121.0, filed Apr. 1, 1999.

FIELD OF THE INVENTION

The invention relates to a resistance welding method as stated in the heading of claim 1 as well as a device as stated in the heading of claim 9.

BACKGROUND OF THE INVENTION

During resistance welding using direct current, the welding electrodes are heated dissimilarly, whereby the welding electrode with positive polarity gets warmer than the welding electrode with negative polarity. This is due to the Peltier heat, and Joule's heat. The heating of the electrode with positive polarity on one side causes a reduction of serviceable life or endurance of this electrode as well as shifting of the position of a welding spot created during welding from the desired middle position in the direction of the warmer electrode with positive polarity. This is especially true for material with higher heat conductivity, such as aluminum.

In order to avoid these disadvantages, it is known to use alternating current for welding.

A method and a device for resistance welding with alternating current is known from DE 41 13 117 C1. With this method a sequence of positive medium frequency current pulses is first created on the primary side of a welding transformer, and then a sequence of negative medium frequency current pulses is created and transferred to the welding electrodes connected to secondary side of the transformer. This results in alternating current. One disadvantage of the known method exists in the fact that the welding transformer not only has to transfer the medium frequency current pulses, but also the resulting current using low frequency, because the welding alternating current is gained on the primary side of the transformer. The welding transformer required for this is large and heavy, as well as costly to produce. Furthermore, the welding alternating current must not have a rectangular shape in the known device, because the transfer behavior will not allow such a shape.

Similar devices are known from DE 30 05 083 C2 and EP 0 261 328 A1.

A device for electric welding is also known from DE 295 08 868 U1.

A method for resistance welding is known from DE 44 40 351 C1, as stated in the heading of claim 1, with which a direct voltage applied to the welding electrodes is commutated during the welding operation in order to produce a welding alternating current. According to the printed publication, this should avoid the welding spot being shifted toward the warmer positive electrode, and is therefore arranged in an asymmetrical way at a contact level, in which the work pieces to be welded are making contact. This interferes with the stability of the weld joint. The method known from the printed publication has proven that the formation of welding spots between the work pieces to be welded, which are asymmetrical at the contact level, cannot be eliminated reliably.

Resistance welding methods are also known from EP-A-0 688 626, U.S. Pat. No. 5,237,147, U.S. Pat. No. 4,973,815, EP-A-0 835 713, and EP-A-0 756 915.

SUMMARY OF THE INVENTION

The invention is based on the task of stating a process, as stated in the heading of claim 1, as well as a device, as stated in the heading of claim 11, which does not have the disadvantage of the known process or the known device, and which also reduces the risk of a formation of a welding spot that is asymmetrical with regard to the contact plane between the work pieces to be welded.

This task is solved as described in claim 1 with regard to the process, and as described in claim 11 with regard to the device.

In the process according to the invention, at least one parameter of the welding process is measured during the welding operation, i.e., during the formation of a welding spot or a weld seam. According to the invention, a commutation of the direct voltage then takes place during the welding operation according to at least one measured parameter. The measured parameter can, for instance, be the temperature of the welding electrodes, which are hereinafter referred to as electrodes. For example, if the measured temperature shows that the electrode with positive polarity is heated more, the electrodes are commutated. The electrode initially with negative polarity is now heated more, and therefore the colder electrode is heated more than the other electrode now with negative polarity, until the temperature difference is neutralized. If the electrode now with positive polarity is heated more, the commutation is repeated. In this way, a temperature difference between the welding electrodes can be nearly eliminated, if the formation of a welding spot that is symmetrical with regard to the contact plane between the work pieces to be welded is desired. If the formation of a welding spot that is asymmetrical with regard to the contact plane is not desired, this can be achieved in the process relating to the invention by controlling the temperature of the welding electrodes by controlling the commutation in any desired way.

Additionally, the teaching according to the invention enables equal wear on the electrodes, thereby increasing their serviceable life or endurance. This prevents premature wear and reduces setup time necessary due to exchanging the electrodes. In this way, the welding process can be operated at less cost.

The process and the device according to the invention are suited for spot and seam welding, and especially for welding of aluminum.

An improvement of the teaching according to the invention includes that in order to influence the formation of a welding spot at the contact plane between the work pieces to be welded and/or to influence the serviceable life or endurance of the electrodes, at least one known value of the welding alternating current according to at least one parameter of the welding process measured during the welding operation is influenced. In this way, an adjustment of the process relating to the invention to, for instance, different types of work pieces to be welded, is possible, and the flexibility of the process relating to the invention is increased.

An improvement of the design mentioned above includes that the known values of the welding alternating current at least include

- the ratio of the duration of a positive half wave at the duration of a negative half wave of the welding alternating current (balance), and/or
- a time distance between a positive half wave, and a negative half wave of the welding alternating current (dead time), and/or
- the curve shape of the positive half wave and/or the curve shape of the negative half wave of the welding alternating current and/or
- the amplitude of the positive half wave and/or the amplitude of the negative half wave of the welding alternating current and/or
- the mark space ratio of the welding alternating current.

By selecting one or more of these known values, the welding operation can be influenced within additional limits in the desired way. The known values can be adjusted separately, or at least partially in combination with each other and/or influenced during the welding process. During the welding process the known values can also either be essentially sustained, or changed.

Generally, any parameter of the welding process can be used as a basis for influencing known values. According to an improvement of the design, the parameters of the welding process include at least the temperature of the welding electrodes, and/or

- the thickness and/or the material of the work pieces to be welded, and/or
- the force with which the welding electrode contact the work pieces to be welded, and/or
- the degree of wear at the welding electrodes, and/or
- an electric resistance existing between the work pieces to be welded at the beginning of the welding process, and/or
- the total duration of the welding time, during which the welding operation took place at unchanged polarity of the electrodes since a previous commutation of the direct voltage, and/or
- the number of weld joints, especially the weld points or weld seams created at unchanged polarity since a previous commutation of the direct voltage, and/or
- the ratio of duration, during which the polarity of an electrode was positive for the creation of a number of weld joints at the duration, during which the polarity of the electrode was negative for the creation of a number of weld joints.

These parameters represent a reliable basis for influencing known values of the welding alternating current. If necessary, additional parameters of the welding process can be used.

According to one design, the direct voltage is commutated at least twice during the welding process.

An especially beneficial improvement includes that at least one parameter of the welding process is measured during the welding process, and that according to the measured parameter, or the measured parameters, at least one known value of the welding alternating current is controlled or regulated. In this design, the parameters of the welding process are measured online during the welding process, so that the influencing of the known values of the welding alternating current according to the changes of the parameters is possible. In this way, a more detailed control of the position of the welding spot relative to the contact plane, or a more specific regulating of the wear of the electrodes is possible, and the quality of the welding spot is improved.

Generally, it is possible with the process relating to the invention, to position the welding spot relative to the contact plane between the work pieces to be welded in any desired way. Appropriately, however, the known values of the welding alternating current are adjusted, controlled, or regulated according to at least one parameter of the welding process in such a way, that a welding spot forms on the contact plane between the work pieces to be welded, which is symmetrical to at least this contact plane. This results in an especially superb quality of the welding joint.

Another improvement of the process relating to the invention includes that the number of commutations and/or the known values of the welding alternating current is controlled in such a way that the sum of the welding times of a number of welding operations, or at predetermined time intervals, during which the polarity of an electrode is positive, is essentially the same sum as the welding times, during which the polarity of the electrode is negative. With this design, the welding electrodes are therefore "stressed" with the same amount of positive, and negative polarity, so that an uneven wear can be avoided reliably.

The degree of wear of the welding electrodes can be detected in any suitable way. According to a beneficial improvement of the design, the degree of wear of the welding electrodes and/or the form of the welding electrodes is detected with the use of optical means.

The temperature of the welding electrodes can be measured in any suitable way. According to a beneficial improvement of the design, the temperature of the welding electrodes is measured contact-less, especially with means for measuring of infrared radiation, as for example in infrared cameras.

The device according to the invention includes measuring means, which measure at least one parameter of the welding process during the welding operation, as well as control means, which are connected to the measuring means, which are applied to the inverter according to the measured parameter, or at least one of the measured parameters in such a way, that the commutation of the direct voltage takes place during the welding operation according to the measured parameter, or at least one of the measured parameters. In the device according to the invention, the commutation of the direct voltage therefore takes place according to the measured parameter, or the measured parameters.

An improvement of the device relating to the invention includes that the voltage generating means have the following

- rectifier means for the rectification of an alternating voltage,
- chopper means, which are arranged like the rectifier means, and which chop the rectified alternating voltage into impulses, and
- a welding transformer, which is arranged like the chopper means, and rectifier means, which are arranged like the welding transformer in order to generate a direct voltage to be applied to the welding electrodes.

This device in simple in its construction, and therefore low in cost as well as reliable in its operation.

An especially beneficial improvement of the device according to the invention includes that the inverter means are connected to the welding electrodes, and are connected to the secondary winding of the welding transformer via a rectifier. As this causes the generation of the welding alternating current on the secondary side of the welding transformer, a welding transformer of relatively low weight and volume can be used, because the now occurring frequencies of the current to be transferred by the welding transformer are in the KHz range. For this purpose, large and heavy welding transformers are no longer required. This enables the use of the device according to the invention in welding robots.

Another improvement of the device according to the invention includes that the inverter means switches are equipped with at least two switches, which can be regulated by the control means. The switches can be constructed in any desired way, for instance, as transistors, thyristors, or similar. Reference is made to DE 295 08 868 U 1 with regard to the design of the control means, which shows several different suitable control means being referred to herein.

It is also possible to enter parameters of the welding process into the device according to the invention instead of, or in addition to the measurement. In this regard, an improvement of the design includes an input device connected to the control means for the external input of at least one parameter of the welding process. This way, the welding process can be influenced manually.

Another beneficial and suitable improvement of the device according to the invention is stated in the additional sub-claims 15 through 18.

The invention is further described in detail with the attached drawing containing an example.

BRIEF DESCRIPTION OF THE DRAWINGS

The figures show:

FIG. 1 a schematic block diagram of an example of a device relating to the invention for performing the process according to the invention;

DETAILED DESCRIPTION OF THE INVENTION

Figure 2:
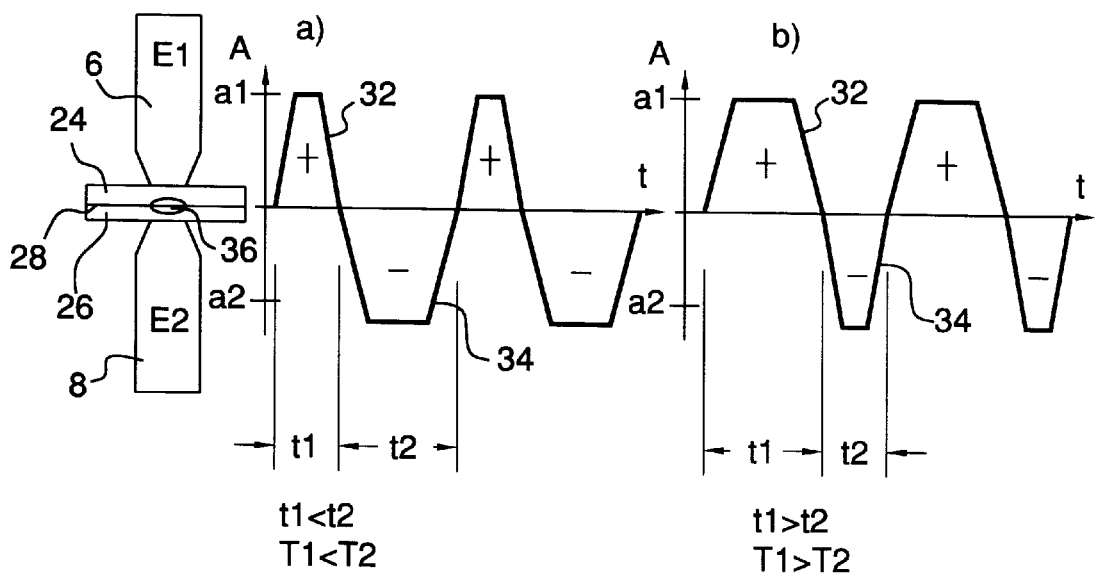
FIG. 2 a time diagram of curve shapes of a welding alternating current.

FIG. 1 illustrates a schematic block diagram of a device 2 relating to the invention in resistance welding for performing the process relating to the invention, which is equipped with voltage generating means 4 for generating a direct voltage to be applied to the welding electrodes 6, 8 of the device, hereinafter referred to as electrodes. In addition, the device is equipped with inverter means 8 for generating a direct voltage to be applied to the welding electrodes 6, 8 for generating welding alternating current by commutation.

The voltage generating means 4 in this example are equipped with rectifier means 10 for the rectification of a 3-phase alternating current in this example. Also, the voltage generating means 4 are equipped with choppers 12, which are arranged the same way as the rectifier means 10, and which chop the rectified alternating voltage into impulses, for example at a frequency of 50 kHz. The chopper means 12 are equipped with a welding transformer 14 with a medium frequency of, for instance, 1–100 kHz. Since the transfer of lower frequencies by the welding transformer 14 is not required, it can be of an accordingly small, and therefore light-weight construction.

The inverter means 8 are equipped with a rectifier 16, which rectifies the secondary voltage of the welding transformer 14, and therefore generates direct voltage applied to the electrodes 6, 8. The rectifier 16 is equipped with an inverter 18, which commutates the direct voltage applied to the electrodes 6, 8 for the generation of a welding alternating current.

The device 2 relating to the invention is further equipped with control means 20, which regulate the inverter 18 of the inverter means 8 in such a way that it commutates the direct voltage applied to the electrodes 6, 8 during a welding operation according to at least one parameter of the welding process measured during the welding operation. Measuring means 22 serve for measuring parameters of the welding process, for example the temperature of the electrodes 6, 8 and/or the thickness of the work pieces 24, 26 to be welded, and which are arranged next to each other at a contact plane 28, and/or the force with which the electrodes 6, 8 contact the work pieces 24, 26 to be welded, and/or the degree of wear of the electrodes 6, 8, and/or an electric resistance of the work pieces 24, 26 to be welded existing between the electrodes 6, 8 at the beginning of the welding process. The measuring means can measure the parameter, or the parameters of the welding process before and/or during the welding process.

The control means 20 serve as the control of the welding process. They control, or regulate the commutation of the direct voltage of the electrodes 6, 8, and possibly at least one known value of the welding alternating current generated by the inverter 18 according to the parameters measured by the measuring means 22 during the welding process.

The known values of the welding alternating current, which can be influenced by the control means 20, for instance, can contain the ratio of the duration of a positive half wave at the duration of a negative half wave (balance), and/or a time distance between a positive half wave, and a negative half wave (dead time), and/or the curve shape of the positive half wave and/or the curve shape of the negative half wave, and/or the amplitude of the positive half wave and/or the amplitude of the negative half wave, and/or the mark space ratio of the welding alternating current.

An input device 30 connected to the control means 20 serves as the input device for the external input of at least one parameter of the welding process.

The process relating to the invention is performed with the aid of the device 2 relating to the invention, as follows:

An alternating voltage rectified by the rectifier means 10 is chopped into impulses by the chopper means 12, and transformed by the welding transformer 14. The rectifier 16 connected to the welding transformer on its secondary side generates a direct voltage from the start signal on the secondary side of the welding transformer 14, which is applied to the electrodes 6, 8. By commutating the direct voltage applied to the electrodes 6, 8, the inverter 18 generates a welding alternating current in an essentially rectangular curve shape (see FIG. 2), while the inverter 18 is regulated by the control means 20 in such a way, that the commutation takes place according to the measured parameter, or the measured parameters of the welding process. According to the requirements of each welding process, the measuring means 20 may additionally control the known values of the welding alternating current in such a way, that the welding alternating current possesses the desired curve shape.

On the left side of FIG. 2, a first example of such a curve form is illustrated, with which the duration of a positive half wave is shorter than the duration of a negative half wave, while the half waves possess the same amplitude, and are arranged without any timed intervals (dead time).

On the right side of FIG. 2, an additional curve shape is illustrated, which differs from the curve shape illustrated on the left side of FIG. 2, in that the duration of the positive half wave 32 is larger than the duration of the negative half wave 34.

Figure 3:
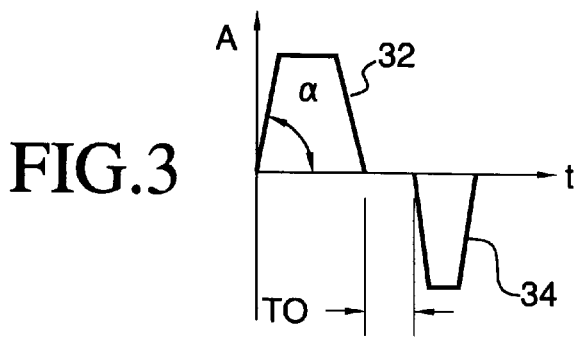
FIG. 3 in the same illustration as FIG. 2, an additional curve shape of a welding alternating current.

FIG. 3 illustrates a third example of a curve shape, which differs from the curve shape illustrated on the right side of FIG. 2, in that the positive and negative half waves occur in timed intervals (dead time).

The measuring means 22 measure one or several parameters of the welding process continuously or in timed intervals during the welding process, while the control means 20 control or regulate the known values of the welding alternating current according to the parameters measured by the measuring means 22, as well as the commutation of the direct voltage in such a way, that a welding spot with the reference number 36 in FIG. 2 forms at the contact plane 28 between the work pieces 24, 26 to be welded, which is symmetrical to at least the contact plane 28.

If the polarity of electrode 6 is initially positive, and the polarity of electrode 8 is negative, and the control means 20 detect that the positive electrode 6 was heated more than the negative electrode 8, and that the temperature difference between the electrodes 6, 8 exceeds a predetermined value, the control means 20 then regulate the rectifier 18 in such a way that is commutates the direct voltage of the electrodes 6, 8. As a result, the initially negative, and therefore colder electrode 8 is now positive, and is heated more than the initially positive, and now negative electrode 6, until the temperature difference between the electrodes is neutralized.

Additionally, the control means 20 can possibly control or regulate the known values of the welding alternating current. For example, if the control means 20 detect that one of the electrodes 6, 8 illustrated in the curve shape to the left of FIG. 2 is heated at a higher temperature, a switching to the curve shape illustrated to the right of FIG. 2 can occur, so that the warmer electrode 6, 8 is subsequently stressed with more negative polarity, and the colder electrode 6, 8 is stressed with more positive polarity, resulting in an adjustment of the temperature of both electrodes 6, 8. The result is the formation of a welding spot symmetrical to the contact plane 28, and therefore a high-quality welding joint between the work pieces 24, 26. Furthermore, this achieves even wear of the electrodes 6, 8.

The process according to the invention enables any optional control of the position of the welding spot 36 in vertical direction of the contact plane 28 by suitably controlling the temperature of the electrodes 6, 8. If desired, the process according to the invention may also be used for the formation of a welding spot 36 asymmetrical to the contact plane 28.

If necessary, all known values of the welding alternating current mentioned above can be influenced by the control means 20 in the desired way. Furthermore, any suitable parameters of the welding process can be used to influence these known values.

While this invention has been described as having a preferred design, it is understood that it is capable of further modifications, and uses and/or adaptations of the invention and following in general the principle of the invention and including such departures from the present disclosure as come within the known or customary practice in the art to which the invention pertains, and as may be applied to the central features hereinbefore set forth, and fall within the scope of the invention or limits of the claims appended hereto.

What is claimed is:
1. Resistance welding process, comprising:
a) a direct voltage applied to the welding electrodes is commutated during the welding of a weld for generating welding alternating current,
b) at least one parameter of the welding process is measured during the welding of a weld, and
c) the time of commutation of the direct voltage is determined according to the at least one measured parameter measured during the welding of a weld.
2. Process according to claim 1, wherein:
a) in order to influence the welding of a weld at a contact plane between work pieces to be welded and to influence the serviceable life of the electrodes, the at least one parameter of the welding process measured during the welding of a weld is influenced.
3. Process according to claim 1, wherein:
a) the welding alternating current is regulated according to the at least one measured parameter of the welding process for forming a weld on a contact plane between work pieces to be welded, and the weld is substantially symmetrical to the contact plane.
4. Process according to claim 1, wherein:
a) in order to influence at least one of the formation of a weld at a contact plane between work pieces to be welded and to influence the serviceable life or endurance of the electrodes, at least one known value of the welding alternating current according to at least one parameter of the welding process measured during the welding of a weld is influenced.
5. Process according to claim 4, wherein:
a) the at least one known value of the welding alternating current includes at least one of:
   i) the ratio of the duration of a positive half wave to the duration of a negative half wave of the welding alternating current (balance);
   ii) a time distance between a positive half wave, and a negative half wave of the welding alternating current (dead time);
   iii) at least one of the curve shape of the positive half wave and the curve shape of the negative half wave of the welding alternating current;
   iv) at least one of the amplitude of the positive half wave and the amplitude of the negative half wave of the welding alternating current; and
   v) the mark space ratio of the welding alternating current.
6. Process according to claim 4, wherein:
a) the at least one known value of the welding alternating current is regulated according to at least one measured parameter of the welding process in such a way that a weld forms on the contact plane between the work pieces to be welded, and the weld is symmetrical to at least this contact plane.
7. Process according to claim 4, wherein:
a) at least one of the number of commutations and the at least one known value of the welding alternating current according to at least one parameter of the welding process is controlled in such a way that one of a sum of the welding times of welding a number of welds and a sum of the number of welding times taken at predetermined time intervals, during which the polarity of an electrode is positive, is essentially the same sum as the sum of the number of welding times of a number of welds, during which the polarity of the electrode is negative.
8. Process according to claim 1, wherein:
a) the at least one parameter of the welding process includes at least one of:
   i) the temperature of the welding electrodes;
   ii) at least one of the thickness and the material of work pieces to be welded;

iii) the force with which the welding electrodes contact the work pieces to be welded;
iv) the degree of wear at the welding electrodes;
v) an electric resistance existing between the work pieces to be welded at the beginning of the welding process;
vi) the total duration of the welding time, during which the welding of a weld took place at unchanged polarity since a previous commutation of the direct voltage;
vii) the number of welds created at unchanged polarity of the electrodes since a previous commutation of the direct voltage; and
viii) the ratio of duration, during which the polarity of an electrode was positive for the creation of a number of welds, to the duration, during which the polarity of the electrode was negative for the creation of a number of welds.

9. Process according to claim 1, wherein:
a) the direct voltage is commutated at least twice during the welding of a weld.

10. Process according to claim 1, wherein:
a) according to the at least one parameter of the welding process measured during the welding of a weld, at least one known value of the welding alternating current is regulated.

11. Process according to claim 10, wherein:
a) at least one of the degree of wear of the welding electrodes and the form of the welding electrodes is detected with the use of optical means.

12. Process according to claim 10, wherein:
a) the temperature of the welding electrodes is measured contact-less by use of an infrared radiation measurement device.

13. Resistance welding device for the performance of the process according to claim 1, comprising:
a) a voltage generator being provided for generating a direct voltage applied to the welding electrodes of the device;
b) an inverter being provided for generating a welding alternating current by commutation of the direct voltage of the welding electrodes during the welding operation;
c) a measuring element being provided, the measuring element measuring at least one parameter of the welding process during the welding of a weld; and
d) a control element connected to the measuring element, the control element regulating the inverter according to at least one of the measured parameters in such a way, that the time of the commutation of the direct voltage according to the at least one measured parameter, is regulated.

14. Device according to claim 13, wherein:
a) the voltage generator includes the following:
i) a rectifier for the rectification of an alternating voltage;
ii) a chopper arranged like the rectifier and which chops the rectified alternating voltage into impulses;
iii) a welding transformer arranged like the chopper; and
iv) a rectifier arranged like the welding transformer in order to generate a direct voltage to be applied to the welding electrodes.

15. Device according to claim 13, wherein:
a) a welding transformer is provided; and
b) the inverter is connected to the welding electrodes and is connected to a secondary winding of the welding transformer via a rectifier.

16. Device according to claim 13, wherein:
a) the inverter is equipped with at least two switches regulatable by the control element.

17. Device according to claim 13, wherein:
a) the control element at least one of controls and regulates at least one known value of the welding alternating current according to the at least one measured parameter during the welding process.

18. Device according to claim 17, wherein:
a) the at least one known value of the welding alternating current includes at least one of:
i) the ratio of the duration of a positive half wave at the duration of a negative half wave of the welding alternating current (balance);
ii) a time distance between a positive half wave, and a negative half wave of the welding alternating current (dead time);
iii) at least one of the curve shape of the positive half wave and the curve shape of the negative half wave of the welding alternating current;
iv) at least one of the amplitude of the positive half wave and the amplitude of the negative half wave of the welding alternating current; and
v) the mark space ratio of the welding alternating current.

19. Device according to claim 13, wherein:
a) the at least one measured parameter of the welding process includes at least one of:
i) the temperature of the welding electrodes;
ii) at least one of the thickness and the material of the work pieces to be welded;
iii) the force with which the welding electrode contacts the work pieces to be welded;
iv) the degree of wear at the welding electrodes;
v) an electric resistance existing between the work pieces to be welded at the beginning of the welding process;
vi) the total duration of the welding time, during which the welding operation took place at unchanged polarity of the electrodes since a previous commutation of the direct voltage;
vii) the number of welds created at unchanged polarity of the electrodes since a previous commutation of the direct voltage; and
viii) the ratio of duration, during which the polarity of an electrode was positive for the creation of a number of welds, to the duration, during which the polarity of the electrode was negative for the creation of a number of welds.

20. Device according to claim 13, wherein:
a) the control element regulates at least one known value of the welding alternating current according to the at least one measured parameter of the welding process in such a way that the weld forms on the contact plane between the work pieces to be welded, which contact plane is substantially symmetrical to at least this contact plane.

21. Device according to claim 13, wherein:
a) an input device is connected to the control element for the external input of at least one measured parameter of the welding process.

22. Resistance welding device, comprising:
a) a voltage generator being provided, the voltage generator being configured for generating a direct voltage applied to welding electrodes of the device;
b) an inverter being provided, the inverter being configured for generating a welding alternating current by commutation of direct voltage of the welding electrodes during a welding operation;
c) a measuring element being provided, the measuring element being configured for measuring at least one parameter of the welding process during the welding of a weld; and
d) a control element connected to the measuring element, the control element being configured for regulating the inverter according to the at least one measured parameter and for regulating the time of the commutation of the direct voltage according to the at least one measured parameter.

23. Device according to claim 22, wherein:
a) the voltage generator includes:
   i) a rectifier, the rectifier being configured for rectifying an alternating voltage;
   ii) a chopper, the chopper being configured for chopping the rectified alternating voltage into impulses;
   iii) a welding transformer; and
   iv) a further rectifier, the further rectifier being configured for generating a direct voltage to be applied to the welding electrodes.

24. Device according to claim 22, wherein:
a) a welding transformer having a secondary winding is provided;
b) a rectifier is provided; and
c) the inverter is connected to the welding electrodes and is connected to the secondary winding of the welding transformer via the rectifier.

* * * * *